Figure 1:
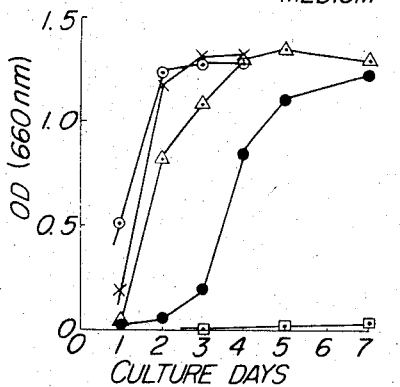
Figure 2A:
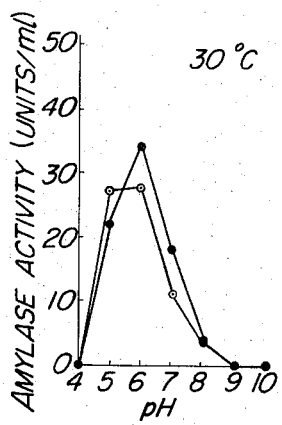
Figure 2B:
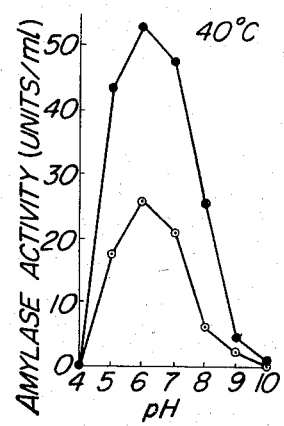
Figure 2C:
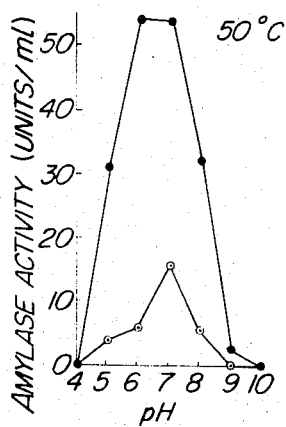
Figure 2D:
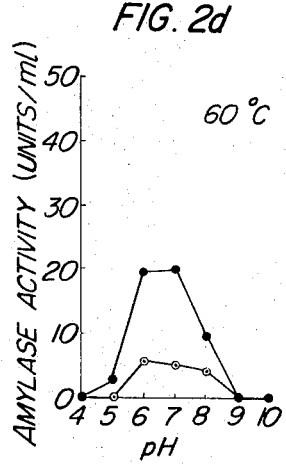
Figure 2E:
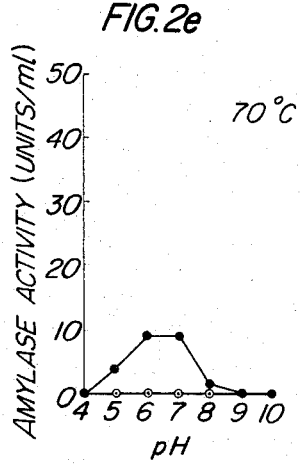
Figure 3A:
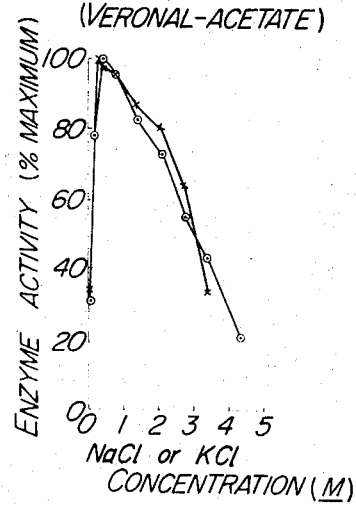
Figure 3B:
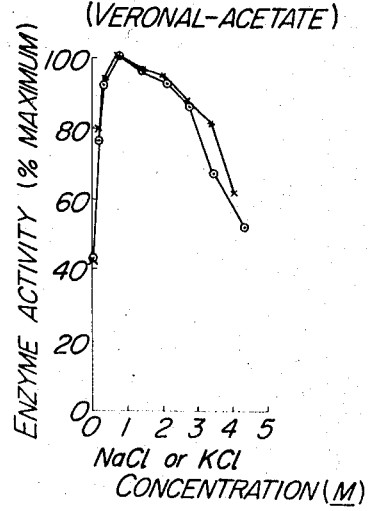
Figure 3C:
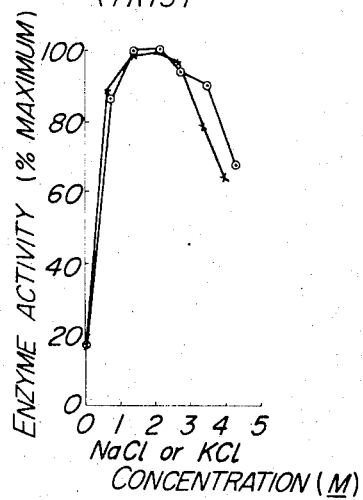
Figure 3D:
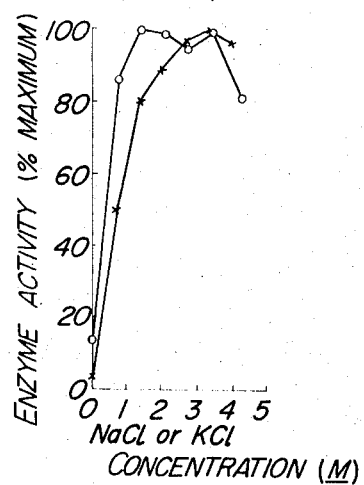

United States Patent
Onishi

[11] 3,767,530
[45] Oct. 23, 1973

[54] PROCESS FOR PRODUCING HALOPHILIC ALPHA-AMYLASE

[75] Inventor: Hiroshi Onishi, Noda, Japan

[73] Assignee: Noda Institute for Scientific Research, Noda-shi, Japan

[22] Filed: Oct. 19, 1971

[21] Appl. No.: 190,561

[30] Foreign Application Priority Data
Oct. 20, 1970  Japan.................................. 45/91675

[52] U.S. Cl. ................................. 195/62, 195/66 R
[51] Int. Cl............................................ C12d 13/10
[58] Field of Search.......................... 195/62, 65, 66

[56] References Cited
OTHER PUBLICATIONS

Good et al., Journal of Bacteriology, Oct. 1970 pages 601–603.

Primary Examiner—Lionel M. Shapiro
Attorney—Cushman, Darby and Cushman

[57] ABSTRACT

Novel halophilic α-amylase is produced by cultivating *Micrococcus halibius sp. n.* ATCC 21727 in a medium containing 0.2 – 2 W/V % of starch and 1 – 3 M of sodium chloride or potassium chloride at 30° – 37°C, pH 6 – 8 under aerobic conditions thereby to form and accumulate halophilic α-amylase in the medium and recovering the same. The halophilic α-amylase is useful in food and medicament fields.

5 Claims, 10 Drawing Figures

□: NaCl 0 M CONCENTRATION
⊙: NaCl 1 M CONCENTRATION
×: NaCl 2 M CONCENTRATION
△: NaCl 3 M CONCENTRATION
●: NaCl 4 M CONCENTRATION

30°C, pH 5.0
(VERONAL-ACETATE)

40°C, pH 6.0
(VERONAL-ACETATE)

50°C, pH 7.0
(TRIS)

50°C, pH 8.0
(TRIS)

⊙ : NaCl
× : KCl

PROCESS FOR PRODUCING HALOPHILIC ALPHA-AMYLASE

This invention relates to a process for producing novel halophilic α-amylase by fermenation and to a novel halophilic α-amylase useful in food and medicament fields.

Recently, Good and Hartman investigated properties of the amylase from *Halobacterium halobium* (Good, W.A. and Hartman P.A., 1970. Properties of the amylase from *Halobacterium halobium*: J. Bacteriol. 104 601 – 603), and Nachum and Bartholomew examined the relationship between temperature and salt concentration on the activity and stability of the amylase from a *Halobacterium* species (Nachum, R. and Bartholomew, J.W.: Bacteriol. Proc. p. 137, 1969).

The present inventor has found another novel halophilic α-amylase having a unique salt response pattern. That is, the present inventor has found that a large amount of α-amylase can be produced by cultivating a novel halophilic bacterium, isolated from unrefined solar salt, in medium containing starch and 1 – 3 M of sodium chloride or potassium chloride under aerobic conditions. Furthermore, the present inventor has found that the thus prepared enzyme is an entirely novel halophilic α-amylase having the best activity at pH 6 to 7 in 1.4 to 2.0 M sodium chloride or potassium chloride, at 50° C, and the activity is completely lost by extensive dialysis against water. The present invention is based on these findings.

An object of the present invention is to provide a process for producing a novel and useful halophilic α-amylase having said properties.

Another object of the present invention is to provide a useful halophilic amylase in food and medicament fields.

FIG. 1 shows growth curves of *Micrococcus halobius* SP. N. ATCC 21727 in media of various added NaCl concentrations.

FIGS. 2a – 2e show effects of pH and temperature on the activity of the halophilic α-amylase produced by *Micrococcus halobius* SP. N. ATCC 21727.

FIGS. 3a – 3d show characteristic salt response patterns of the halophilic α-amylase produced by *Micrococcus halobius* SP. N. ATCC 21727.

The microorganism used in the present invention has been isolated from unrefined solar salt. Morphological, cultural and physiological properties are observed according to the method of Skerman, V.B.D., 1959; a Guide to the Identification of the Genera of Bacteria, The Williams and Wilkins Co., Baltimore, Maryland, USA.

1. Morphology
   Shape and size: Spheres, 0.8 to 1.5μ in diameter, cell grouping is indefinite, single, in pairs, with some tetrads and small irregular clumps occurring. Non-motile. Spore not formed.
   Gram — positive.

2. Cultural characteristics
   Agar slant: Slightly greyish white, glistening, smooth growth on surface including periphery, and slightly raised.
   Giant colonies: Circular, slightly greyish white, glistening, and smooth growth on surface including periphery.
   Broth: Pellicle not formed, only turbid and precipitated.
   Growth temperature: mesophile. Optimum temperature, between 25° and 37° C.
   Growth pH: Neutrophilic
   Oxygen requirement: Aerobic 3. Physiological characteristics:
   Nitrites not produced from nitrates.
   Hydrogen sulfide not produced.
   Indole not produced.
   Litmus milk: Slightly acid and coagulated.
   Using the MOF medium of Leifson [(Leifson E., J. Bacteriol. 85, 1183 (1963)], acid but no gas is produced from glucose, galactose (slow), xylose, maltose, sucrose, lactose, starch, raffinose, glycerol and mannitol aerobically but not anaerobically. In other words, the carbohydrate metabolism is oxidative and not fermentative. Only 0.08 % total acid is produced from glucose by shaking culture at 30° C for 7 days. Trehalose and inulin are not attacked.
   Catalase — positive
   Does not utilize $NH_4H_2PO_4$ as a sole source of nitrogen.
   Gelatin stab: No liquefaction
   Chitin utilization: None Growth in medium of various sodium chloride concentration: The bacterium is grown in Sehgal and Gibbons' complex (SGC) medium (Sehgal, S.N. and Gibbons, N.E.: 1960, Effect of some metal ions on the growth of *Halobacterium cutirubrum*, Can. J. Microbiol. 6, 165 – 169), to which NaCl is added at designated concentrations. Inocula (0.2 ml) of 2-day bacterial culture in 2 M NaCl SGC medium are added to 500-ml shake flasks containing 80 ml of medium. The flasks are shaken at 30° C on a reciprocal shaker operating at 140 rev./min. with a stroke of 7.5 cm. Growth is measured turbidimetrically at 660 nm against an uninoculated blank. The growth curves in the NaCl media are shown in FIG. 1. The best growth is observed in the 1 M and 2 M NaCl media, where maximum yield is attained after 2 to 3 days' cultivation. Growth is fairly good in the 3 M NaCl medium. Moderate growth is observed in the 4 M NaCl medium after 2 to 3 days' lag. However, growth does not occur in media without added NaCl even after 7 days.

Similar growth patterns are shown in the media containing KCl in place of NaCl. No growth is observed in the media containing 1, 2 and 3 M glucose but no added NaCl [The SGC medium without added NaCl still contains 182 mg $Na^+$ per dl originated from vitamin-free casamino acids (Difco) and sodium citrate.] The isolated microorganism is thus considered a moderate halophile belonging to the genus *Micrococcus*.

As an analog to the present microorganisms, *Micrococcus halodenitrificans* is disclosed in Bergey's Manual of Determinative Bateriology, 7th edition, 1957. However, the present microorganisms are different from *Micrococcus halodenitrificans* in that the latter is Gram-negative and forms nitrogen gas from nitrates.

As another analog to the present microorganisms, there is *Micrococcus morrhuae*. The present microorganisms are different from *Micrococcus morrhuae* in that the latter is a red bacterium.

As further analog to the present microorganisms, *Micrococcus halodurans* is disclosed in International Bulletin of Bacteriological Nomenclature and Taxonomy 15, 181 (1965). However, *Micrococcus halodurans* has a nitrate reducibility and grows in medium of 0 –

15 W/V % sodium chloride concentration. In these respects, the present microorganism is different from *Micrococcus halodurans*. Thus, the present inventor has considered the microorganism, newly isolated by him, a new species belonging to the genus *Micrococcus* and named them *Micrococcus halobius* SP. N.

A strain of the thus isolated *Micrococous halobius* SP. N. was deposited in American Type Culture Collection, 12301 Parklawn Drive, Rockville, Maryland, USA under accession number ATCC 21727.

Any of ordinary media for cultivating bacteria can be used for cultivating the present microorganism, so long as the medium contains starch and sodium chloride or potassium chloride. Starch content in the medium suitable for the production of halophilic α-amylase is 0.2 – 2.0 W/V %, preferably 1.0 W/V %. Sodium chloride or potassium chloride concentration is 1 – 3 M, preferably 1 – 2 M. Little α-amylase is produced when the halophile is cultivated in medium without starch, regardless of the NaCl or KCl concentration. On the other hand, the α-amylase is produced in an increased amount when soluble starch is added to the medium.

Most preferable composition of the SGC media is given in the following Table 1.

Table 1 casamino acid—1 g/100 ml
yeast extract—1 g/100 ml
sodium citrate—0.3 g/100 ml
potassium chloride—0.2 g/100 ml
magnesium sulfate—2 g/100 ml
sodium chloride—1 – 2 M
ferrous chloride—2.3 mg/100 ml
soluble starch—1 g/100 ml
pH—6.2

Potassium chloride can be used at the same concentration as for sodium chloride, i.e., 1 – 2 M, in place of sodium chloride.

Preferable cultural conditions are so selected that the activity of the halophilic α-amylase may be maximum.

Usually, it is preferable to carry out liquid culture under aerobic conditions at 30° – 37°C, pH 6–8. The cultivation time depends upon a sodium chloride or potassium chloride concentration of the medium. That is, the preferable cultivation time is 40 – 60 hours at 1 – 2 M sodium chloride or potassium chloride concentration and 90 – 100 hours at 3 M sodium chloride or potassium chloride concentration.

After completion of the culture, halophilic α-amylase is obtained by separating cells from broth by such a means as centrifuge, and recovering the α-amylase from the broth. The present halophilic α-amylase can be recovered from the broth according to the conventional method, in which saline condition is necessary. For example, a crude enzyme solution or pure enzyme solution can be obtained by carrying out the recovery according to a proper selection or combination of a salting-out method (e.g., based on addition of ammonium sulfate), a precipitation method (e.g., based on addition of acetone), a dialysis method (e.g., against 0.05 M $CaCl_2$), a method for adsorption and elution based on various ion exchange materials, a gel filtration method, and an electrophoresis method.

Now, the properties of the present halophilic α-amylase produced according to the present process will be explained hereunder:

Amylase activity: Dextrinogenic amylase activity is assayed by the method of Yamaguchi et al (Yamaguchi, K., Matsuzaki, H. and Maruo, B., 1969: Participation of Regulator Gene in the α-amylase Production of *Bacillus subtilis*, J. Gen. Appl. Microbiol. 15 97 – 107): 2 ml of 0.5 % soluble starch in M/25 phosphate buffer (pH 6.0) is mixed with 1 ml of an enzyme solution. After appropriate incubation at 40° C, 0.2 ml aliquot of the reaction mixture is added to 5 ml of M/6000 $I_2$-KI solution. The optical density at 700 nm is measured in a spectrophotometer. Hydrolysis of 0.1 mg of soluble starch in 1 min is defined as one unit of the enzyme activity. In some designated experiments, changes in pH and temperature are made for enzyme assay. Saccharifying activity is checked by determining the reducing sugar liberated.

1. Action:

Only 13.7 % of the starch utilized is transformed to the reducing sugar (calculated as glucose). Therefore, it is presumable that the amylase formed by cultivating *Micrococcus halobius SP. N.* ATCC 21727 consists mainly of α-amylase (dextrinogenic type).

Since all Braun homogenates of the washed bacterial cells resulting from the amylase production culture contain only 0 to 0.5 % of total activity, it is presumable that the halophilic amylase is extracellular.

2. Optimum temperature and pH:

The present halophilic α-amylase produced by cultivating *Micrococcus halobius SP. N.* ATCC 21727 has the best activity at pH 6 – 7, in 1.4 – 2 M NaCl or KCl and at 50° C.

3. Effects of salts, temperature and pH upon the α-amylase activity:

The amylase activity of the culture supernatant after 2 days' culture in 2 M NaCl SGC medium is assayed at two NaCl concentrations, i.e., 0.1 M and 1.4 M and in a range of temperatures from 30° to 70° C and at pH 4.0 – 10.0.

Buffers used are pH 4.0, 5.0 and 6.0 M/14 Veronal-acetate-HCl; pH 7.0 and 8.0 M/10 Tris; pH 9.0 and 10.0 M/10 Glycine.

As shown in FIG. 2, the present halophilic α-amylase is almost equally active in high and low NaCl at 30° C. In contrast, the α-amylase is much more salt-dependent over a pH range of 5.0 to 8.0 at temperatures of 40° C and higher. At pH 4.0, 9.0 and 10.0, little activity remains. The activity is generally low at 60° C and almost negligible at 70° C.

More detailed experiments on effects of pH and temperature on salt requirement of the enzyme are carried out.

The assay is done at 30° to 50° C, pH 5.0 to 8.0 of the same buffers as used in FIG. 2, at various NaCl or KCl concentrations.

The result is given in FIG. 3.

The amylase activity taken as 100 % in each assay is (a) 63.8 units/ml in a 0.36 M NaCl and 57.6 units/ml in a 0.17 M KCl, (b) 90.4 units/ml in a 0.74 M NaCl and 92.2 units/ml in a 0.67 M KCl, (c) 90.5 units/ml in a 1.4 M NaCl and 95.2 units/ml in a 2.0 M KCl and (d) 49.4 units/ml in a 1.4 M NaCl and 91.3 units/ml in a 3.4 M KCl.

At 30° C, pH 5.0, the present halophilic α-amylase requires 0.2 to 0.3 M NaCl or KCl for maximal activity and at 40° C, pH 6.0 it requires 0.7 M NaCl or KCl. At both assay conditions, the amylase is inhibited at higher concentrations.

At 50° C, pH 7.0, it requires 1.4 to 2 M NaCl or KCl and is tolerant to 3.4 M NaCl or KCl, maintaining 80 to 90 percent maximum activity.

At 50° C, pH 8.0, the present halophilic α-amylase requires 1.4 to 3.4 M NaCl or 3.4 M KCl for maximal activity. In this, the present halophilic α-amylase resembles one characteristic of enzymes of exremely halophiles and the best activity is observed at pH 6.0 – 7.0, 50° C in 1.4 to 2.0 M NaCl or KCl. These results show that salt requirement of the *Micrococcus* amylase is greatly influenced by the temperature and pH of the assay.

4. Stability:

The present halophilic α-amylase is stable at pH 6 – 9, when it is allowed to stand at 30° C overnight, but loses its activity at pH 8.3 when heated at 60° C for 5 minutes.

5. Dialysis experiments:

When NaCl is removed by extensive dialysis of cell-free broth against distilled water, the activity of the present halophilic α-amylase is completely lost as shown in Table 2. Dialysis overnight against solutions of 2 M NaCl, 2 M KCl or 0.5 M CaCl$_2$ do not lower the enzyme activity so much. A lower concentration of CaCl$_2$, for example, 0.05 M inhibits the enzyme inactivation, suggesting its useful application for the enzyme purification. Magnesium sulfate (0.5 M), ammonium sulfate (2 M) and glucose (2 M) are not so effective as NaCl or CaCl$_2$ for inhibiting the enzyme inactivation. Dialysis against a diluted solution of 0.2 M NaCl and a concentrated solution of 2 M NaCl containing 0.01 M EDTA (pH 6.2) causes as much inactivation as the dialysis against water. After overnight dialysis against the distilled water, reactivation by dialysis against solutions containing 2 and 3 M NaCl or 2 M KCl is unsuccessful. Dialysis against a 0.5 M CaCl$_2$ solution is partly effective in reactivating a sample dialysed overnight, but not for a sample dialysed 3 days against water.

It is seen that the present enzyme is denatured in a solution which does not contain NaCl or KCl at a high concentration, and its stability and activity is dependent upon divalent metal ion such as Ca$^{2+}$.

TABLE 2

Dialysis of the amylase[a]

| Solution | Time (hrs) | % Inactivation[b] |
|---|---|---|
| Distilled water | 3 | 20 |
| Distilled water | 24 | 89 |
| Distilled water | 70 | 100 |
| 0.2 M NaCl | 20 | 81 |
| 2.0 M NaCl | 20 | 7 |
| 2.0 M KCl | 20 | 0 |
| 2.0 M NaNO$_3$ | 20 | 37 |
| 2.0 M (NH$_4$)$_2$SO$_4$ | 20 | 55 |
| 0.5 M CaCl$_2$·2H$_2$O | 20 | 6 |
| 0.05 M CaCl$_2$·2H$_2$O | 20 | 0 |
| 0.5 M MgSO$_4$·7H$_2$O | 20 | 19 |
| 2.0 M glucose | 20 | 34 |
| 2.0 M NaCl+0.01 M EDTA (pH 6.2) | 20 | 62 |

[a] Dialysis is carried out at 5°C and the amylase activity is assayed in a 1.3 M NaCl at 40°C, pH 6.0.
[b] Initial amylase activity: 24.9 units/ml.

Now, explanation will be made to show that the present halophilic α-amylase produced according to the present process is different from the heretofore well-known halophilic α-amylase and is a novel enzyme.

That is, the properties of the halophilic α-amylase produced by *Micrococcus halobius* S.P. N. ATCC 21727 differ in several respects from those described by Good and Hartman (Good, W.A. and Hartman, P.A.: ibid) for the amylase of *Halobacterium halobium*. Both amylase activities are completely lost after extensive dialysis against distilled water, but the amylase produced by *Halobacterium* requires only a very low concentration of NaCl such as 0.05 to 1.0 % for maximal activity, as compared with the halophilic α-amylase produced by *Micrococcus halobius SP. N.* ATCC 21727, which needs much more NaCl or KCl.

Moreover, the salt requirement of the halophilic α-amylase produced by *Micrococcus halobius SP. N.* ATCC 21727 can be varied from moderately halophilic type to extremely halophilic type by changing the temperature and pH of assay. The present observation shows unexpectedly that the salt requirement of amylase from a moderate halophile is much greater than those of amylase from an extremely halophile. Unlike the α-amylase of *Halobacterium halobium*, the inactivated enzyme of *Micrococcus halobius SP. N.* ATCC 21727 after dialysis against distilled water, is not restored upon the addition of, or by dialysis against, either 2M NaCl or KCl. Since dialysis of the halophilic α-amylase produced by *Micrococcus halobius SP. N.* against 2 M NaCl solution containing 0.01 M EDTA causes much inactivation and the dialysis against only 0.05 M CaCl$_2$ inhibits the loss of activity, the present α-amylase is dependent upon Ca$^{2+}$ ion for stability and activity. The requirement for Ca$^{2+}$ is not observed in the α-amylase produced by *Halobacterium halobium*.

From a viewpoint of enzyme production, the present halophilic α-amylase can be produced in a large scale by submerged fermentation of *Micrococcus halobius SP. N.* ATCC 21727, and is much more advantageous than the α-amylase produced by *Halobacterium halobium*, which gives much greater yield on soft agar than in tubes or shake flasks for broth. The amylase activity of supernatants of the broth obtained by cultivating *Micrococcus halobius SP. N.* ATCC 21727 is fairly strong, for example, 90 unit/ml, and is higher than that of the enzyme produced by cultivating *Bacillus natto* for example, 18 units/ml (Yamaguchi, K., Matsuzaki, H., and Maruo, B: ibid).

Studies on the effect of temperature and salt concentration on the activity and stability of another exocellular α-amylase produced by a *Halobacterium* species show that in 5 % NaCl the α-amylase has a maximal activity at 25° C and almost none at 40° C, whereas at 25 % NaCl the maximal activity is obtained at 55° C. Since the highest activity is obtained at pH 5.6 in 25 % NaCl at 55° C, the α-amylase of the species *Halobacterium* requires a high NaCl concentration for maximal activity like the most enzyme from extremely halophiles (Nachum, R. and Bartholomew, J.W.: ibid).

The *Micrococcus* α-amylase is thus different from the α-amylases of the *Halobacterium sp.* in that the pattern of salt requirement is more dependent upon pH and temperature.

As explained above, the halophilic α-amylase produced according to the present process is a novel enzyme which has not been known yet.

Now, the present invention will be explained, referring to examples.

Example 1

80 ml of a medium having a composition as shown in Table 1, where the NaCl concentration was 2 M, was placed in a 500-ml shake flask, and 0.5 ml of a precul-ture obtained by culturing a strain *Micrococcus halobius SP. N.* ATCC 21727 in the same medium as above at 30° C for 40 hours in advance was inoculated in the shake flask, and cultivated at 30° C for 48 hours with shaking (stroke: 7.5 cm, 140 rev./min.), whereby a culture liquor having an α-amylase activity of 24 units/ml (activity in a reaction solution having 1.4 M sodium chloride concentration) and a specific activity of 10.0 was obtained. The α-amylase of the thus obtained broth has halophilic property as shown in Table 3.

TABLE 3

| NaCl concentration (M) | α-Amylase activity (units/ml) |
|---|---|
| 0.02 | 2 |
| 0.07 | 14 |
| 0.74 | 26 |
| 1.40 | 24 |
| 2.05 | 21 |
| 2.74 | 17 |

When clarified broth after removing cells by centrifugation was kept at a low temperature such as 0°– 5° C, the enzyme activity was very stable.

Further, precipitate by 0.5 – 0.9 saturation of ammonium sulfate was dissolved in an aqueous 12 % sodium chloride solution, and dialysed against an aqueous solution of 0.05 M CaCl₂, whereby inactivation could be considerably prevented. Then, the resulting solution was subjected to Sephadex G-100 (a trade mark of Pharmacia Uppsala, Sweden) gel filtration and eluted with an aqueous solution of 0.05 M calcium chloride, whereby 100 ml of a purified solution of halophilic α-amylase having a specific activity of 365.0 was obtained. The thus purified α-amylase was found to be halophile.

Example 2

80 ml of a medium of composition shown in Table 1, where the NaCl concentration was 1 M, was placed in a 500-ml shake flask, and 0.5 ml of a preculture obtained by cultivating *Micrococcus halobius SP. N.* ATCC 21727 at 30° C for 40 hours in the same medium as above in advance was inoculated in the flask and cultivated at 30° C for 48 hours (stroke: 7.5 cm, 140 rev./min.)

The thus obtained broth (A) was centrifuged to separate cells and subjected to glycogen-complex formation according to the method of Greenwood et al. [Arch Biochm. Biophys. 112 459 – 465 (1965)]. The precipitated complex was dissolved in an aqueous solution of 0.05 M CaCl₂ and dialysed for 1.5 hours against an aqueous solution of 0.05 M CaCl₂. 12 ml of the dialysed solution (B) was subjected to gel filtration in a column of Sephadex G 100 (a trade mark of Pharmacia Uppsala, Sweden) andd then eluted with an aqueous solution of 0.05 M CaCl₂, whereby 5 ml of purified solution (C) of halophilic α-amylase was obtained. Activity of α-amylase of said enzyme solutions (A), (B) and (C) is given in Table 4, together with other properties.

TABLE 4

| | Activity of α-amylase (units/ml) | Protein (mg/ml) | Specific activity (units/protein) |
|---|---|---|---|
| (A) | 90.0 | 2.28 | 39.5 |
| (B) | 309.7 | 0.24 | 1290.4 |
| (C) | (206.1 | 0.024 | 8586.0 |

Note: Activity in reaction solution of 1.4 M NaCl concentration.

Relations between the activity of α-amylase and the NaCl concentration and KCl concentration in said (A) are given in Tables 5 and 6, where it is seen that the present α-amylase is halophilic.

TABLE 5

| NaCl concentration (M) | α-amylase activity (units/ml) |
|---|---|
| 0.02 | 15 |
| 0.68 | 78 |
| 1.36 | 90 |
| 2.05 | 89 |
| 2.75 | 84 |
| 3.41 | 81 |

TABLE 6

| KCl concentration (M) | α-amylase activity (units/ml) |
|---|---|
| 0.67 | 84 |
| 1.34 | 93 |
| 2.01 | 95 |
| 2.68 | 92 |

What is claimed is:

1. A process for producing halophilic α-amylase, which comprises cultivating a strain *Micrococcus halobius sp. n.* ATCC 21727 in a medium containing starch and 1 – 3 M of sodium chloride or potassium chloride under aerobic conditions thereby to form and accumulate halophilic α-amylase in the medium, and recovering the thus accumulated α-amylase from the medium.

2. A process according to claim 1, wherein the cultivating is carried out at pH 6 – 8 and 30°– 37° C.

3. A process according to claim 1, wherein the medium contains 0.2 – 2 W/V % of the starch.

4. A halophilic α-amylase produced by the process of claim 1 having the following properties:
   1. the best activity at 50° C, pH 6 to 7 in 1.4 to 2 M NaCl or KCl;
   2. unique salt response patterns as shown in FIGS. 3(a) to 3(d) and maximal activity at:
      a. 30° C, pH 5.0 in 0.2 – 0.3 M NaCl or KCl,
      b. 40° C, pH 6.0 in 0.7 M NaCl or KCl,
      c. 50° C, pH 6.0 to 7.0 in 1.4 M to 2 M NaCl or KCl,
      d. 50° C, pH 8.0 in 1.4 to 3.4 M NaCl or 3.4 M KCl,
   3. being stable at 30° C, pH 6 to 9 when left overnight, and being inactivated by heating at 60° C, pH 8.3 for 5 minutes,
   4. being completely inactivated when NaCl or KCl is removed by extensive dialysis against distilled water and the completely inactivated amylase being not restored upon addition of, or by dialysis against, either 2 M NaCl or KCl, and
   5. being not inactivated so much by dialysis overnight against 2.0 M NaCl or KCl, or 0.5 M CaCl₂, and being not inactivated at all by dialysis overnight against 0.05 M CaCl₂.

5. A halophilic α-amylase according to claim 4, where the amylase is purified in the presence of 0.05 M CaCl₂.

* * * * *